US007688580B2

(12) United States Patent
Richardson et al.

(10) Patent No.: US 7,688,580 B2
(45) Date of Patent: Mar. 30, 2010

(54) MODULAR ACCESSORY FOR PROTECTIVE CASE ENCLOSING TOUCH SCREEN DEVICE

(75) Inventors: Curtis R. Richardson, Fort Collins, CO (US); Douglas A. Kempel, Fort Collins, CO (US); Jamie L. Johnson, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 465 days.

(21) Appl. No.: 11/768,761

(22) Filed: Jun. 26, 2007

(65) Prior Publication Data

US 2007/0297149 A1 Dec. 27, 2007

Related U.S. Application Data

(63) Continuation-in-part of application No. 11/466,342, filed on Aug. 22, 2006, which is a continuation-in-part of application No. 11/270,732, filed on Nov. 8, 2005, now Pat. No. 7,230,823, which is a continuation of application No. 10/645,439, filed on Aug. 20, 2003, now Pat. No. 6,995,976, which is a continuation of application No. 10/300,200, filed on Nov. 19, 2002, now Pat. No. 6,646,864.

(60) Provisional application No. 60/805,833, filed on Jun. 26, 2006, provisional application No. 60/335,865, filed on Nov. 19, 2001.

(51) Int. Cl.
*G06F 1/16* (2006.01)

(52) U.S. Cl. .......................... 361/679.56; 361/679.02; 361/679.32; 206/320; 206/811

(58) Field of Classification Search ............ 361/679.32, 361/679.56
See application file for complete search history.

(56) References Cited

U.S. PATENT DOCUMENTS

| 1,065,898 | A | | 6/1913 | Goerdes |
| 2,392,787 | A | | 1/1946 | Vermot |
| 2,478,987 | A | | 8/1949 | Vacheron |
| D216,853 | S | | 3/1970 | Schurman |
| D220,233 | S | | 3/1971 | Schurman |
| 3,590,988 | A | | 7/1971 | Hollar |
| D275,822 | S | | 10/1984 | Gatland et al. |
| 4,649,453 | A | * | 3/1987 | Iwasawa ..................... 360/137 |

(Continued)

OTHER PUBLICATIONS

Non-Final Office Action, mailed Mar. 10, 2003, in U.S. Appl. No. 10/300,200, filed Nov. 19, 2002, by Curtis R. Richardson.

(Continued)

*Primary Examiner*—Jayprakash N Gandhi
*Assistant Examiner*—Anthony Q Edwards
(74) *Attorney, Agent, or Firm*—William W. Cochran; Cochran Freund & Young LLC

(57) ABSTRACT

A protective enclosure for an electronic device that has a protective shell that is capable of enclosing and substantially surrounding the touch screen device in a substantially watertight, substantially rigid and substantially crush-resistant manner. Modular units can be releasably connected in a rigid manner to the protective enclosure to form an integrated unitary device that is substantially crush-resistant and watertight unit. The modular units can be interchangeable and connect to the protective case using the same format.

11 Claims, 13 Drawing Sheets

U.S. PATENT DOCUMENTS

| | | |
|---|---|---|
| 4,703,161 A | 10/1987 | McLean |
| 4,762,227 A | 8/1988 | Patterson |
| 5,092,459 A | 3/1992 | Uljanic et al. |
| D327,646 S | 7/1992 | Hardigg et al. |
| D329,747 S | 9/1992 | Embree |
| D330,329 S | 10/1992 | Brightbill |
| 5,175,873 A | 12/1992 | Goldenberg et al. |
| D335,220 S | 5/1993 | Ward et al. |
| D342,609 S | 12/1993 | Brightbill |
| D347,324 S | 5/1994 | Dickenson |
| D347,732 S | 6/1994 | Wentz |
| D353,048 S | 12/1994 | VanSkiver et al. |
| 5,505,328 A | 4/1996 | Stribiak |
| D381,512 S | 7/1997 | Green |
| D386,611 S | 11/1997 | Sheu |
| D402,105 S | 12/1998 | Erickson |
| D409,374 S | 5/1999 | Laba et al. |
| D412,062 S | 7/1999 | Potter et al. |
| D413,202 S | 8/1999 | Schmitt et al. |
| D413,203 S | 8/1999 | Zurwelle et al. |
| D419,297 S | 1/2000 | Richardson et al. |
| D419,767 S | 2/2000 | Richardson et al. |
| D419,768 S | 2/2000 | Richardson et al. |
| 6,031,524 A | 2/2000 | Kunert |
| 6,041,924 A | 3/2000 | Tajima |
| 6,049,813 A | 4/2000 | Danielson et al. |
| D423,772 S | 5/2000 | Cooper et al. |
| 6,058,356 A * | 5/2000 | Swanson et al. ............. 702/99 |
| 6,068,119 A | 5/2000 | Derr et al. |
| 6,073,770 A | 6/2000 | Parker |
| D429,884 S | 8/2000 | Zurwelle et al. |
| 6,094,785 A | 8/2000 | Montgomery |
| 6,138,826 A * | 10/2000 | Kanamori et al. ........ 206/316.2 |
| D433,798 S | 11/2000 | Weinstock |
| 6,147,858 A | 11/2000 | Takahashi |
| D439,407 S | 3/2001 | Parker |
| 6,215,474 B1 | 4/2001 | Shah |
| D441,954 S | 5/2001 | Parker |
| 6,239,968 B1 | 5/2001 | Kim et al. |
| D443,133 S | 6/2001 | Richardson et al. |
| 6,273,252 B1 | 8/2001 | Mitchell |
| 6,301,100 B1 | 10/2001 | Iwata |
| 6,304,459 B1 * | 10/2001 | Toyosato et al. ....... 361/679.03 |
| 6,313,892 B2 | 11/2001 | Gleckman |
| 6,317,313 B1 | 11/2001 | Mosgrove |
| 6,388,877 B1 | 5/2002 | Canova, Jr. et al. |
| 6,396,769 B1 | 5/2002 | Polany |
| 6,415,138 B2 | 7/2002 | Sirola et al. |
| 6,417,056 B1 | 7/2002 | Quek |
| 6,445,577 B1 | 9/2002 | Madsen |
| 6,456,487 B1 | 9/2002 | Hetterick |
| D464,196 S | 10/2002 | Parker |
| 6,471,056 B1 | 10/2002 | Tzeng |
| D465,330 S | 11/2002 | Parker |
| 6,494,321 B1 | 12/2002 | Sadow |
| D469,761 S * | 2/2003 | Nussberger ................ D14/341 |
| D470,659 S | 2/2003 | Story et al. |
| 6,519,141 B2 | 2/2003 | Tseng et al. |
| 6,525,928 B1 | 2/2003 | Madsen et al. |
| 6,536,589 B2 | 3/2003 | Chang |
| D472,384 S | 4/2003 | Richardson et al. |
| 6,552,899 B2 * | 4/2003 | Ronzani et al. ........ 361/679.54 |
| 6,604,618 B1 | 8/2003 | Godshaw |
| 6,614,722 B2 * | 9/2003 | Polany et al. ................ 367/131 |
| 6,617,973 B1 * | 9/2003 | Osterman ................ 340/636.1 |
| 6,646,864 B2 | 11/2003 | Richardson |
| 6,659,274 B2 | 12/2003 | Enners |
| 6,665,174 B1 | 12/2003 | Derr et al. |
| 6,698,608 B2 | 3/2004 | Parker |
| D492,310 S * | 6/2004 | Chien ....................... D14/398 |
| 6,772,879 B1 | 8/2004 | Domotor |
| 6,781,825 B2 | 8/2004 | Shih |
| 6,871,739 B2 | 3/2005 | Lopez |
| 6,892,880 B2 | 5/2005 | Nieves |
| 6,896,134 B2 | 5/2005 | Russell |
| D507,272 S * | 7/2005 | Lodato et al. ............. D14/398 |
| 6,970,109 B2 * | 11/2005 | Wolfson et al. ................ 341/22 |
| D513,123 S | 12/2005 | Richardson et al. |
| D513,451 S | 1/2006 | Richardson et al. |
| D514,808 S | 2/2006 | Morine et al. |
| 6,995,976 B2 | 2/2006 | Richardson |
| D516,309 S | 3/2006 | Richardson |
| D516,553 S | 3/2006 | Richardson et al. |
| D516,556 S | 3/2006 | Graziano |
| D516,807 S | 3/2006 | Richardson et al. |
| D526,780 S | 8/2006 | Richardson et al. |
| D530,079 S | 10/2006 | Thomas et al. |
| 7,158,376 B2 | 1/2007 | Richardson et al. |
| 7,180,735 B2 | 2/2007 | Thomas |
| D539,530 S * | 4/2007 | Sanderson et al. ........... D3/218 |
| D542,524 S | 5/2007 | Richardson et al. |
| 7,230,823 B2 | 6/2007 | Richardson, et al. |
| D557,264 S * | 12/2007 | Richardson et al. ........ D14/399 |
| D581,421 S * | 11/2008 | Richardson et al. ........ D14/440 |
| 2002/0071550 A1 | 6/2002 | Pletikosa |
| 2002/0085342 A1 | 7/2002 | Chen |
| 2002/0101707 A1 | 8/2002 | Canova et al. |
| 2003/0002277 A1 | 1/2003 | Lu |
| 2003/0006968 A1 | 1/2003 | Solomon |
| 2003/0011971 A1 * | 1/2003 | Suzuki et al. ............... 361/680 |
| 2003/0032395 A1 | 2/2003 | Huang et al. |
| 2003/0154414 A1 | 8/2003 | von Mueller et al. |
| 2003/0217940 A1 | 11/2003 | Russell |
| 2004/0011616 A1 | 1/2004 | Rasmussen |
| 2004/0089570 A1 * | 5/2004 | Chien et al. ................. 206/320 |
| 2004/0112776 A1 | 6/2004 | Lord |
| 2004/0120219 A1 | 6/2004 | Polany et al. |
| 2004/0198416 A1 | 10/2004 | Gardner et al. |
| 2005/0174727 A1 | 8/2005 | Thomas |
| 2006/0104021 A1 * | 5/2006 | Chen et al. .................. 361/683 |
| 2006/0274493 A1 | 12/2006 | Richardson |
| 2007/0146985 A1 * | 6/2007 | Mick et al. .................. 361/683 |

OTHER PUBLICATIONS

Non-Final Office Action, mailed May 6, 2004, in U.S. Appl. No. 10/645,439, filed Aug. 20, 2003, by Curtis R. Richardson.
Non-Final Office Action, mailed Sep. 27, 2004, in U.S. Appl. No. 10/645,439, filed Aug. 20, 2003, by Curtis R. Richardson.
Final Office Action, mailed Jun. 9, 2005, in U.S. Appl. No. 10/645,439, filed Aug. 20, 2003, by Curtis R. Richardson.
Non-Final Office Action, mailed Oct. 19, 2006, in U.S. Appl. No. 11/270,732, filed Nov. 8, 2005, by Curtis R. Richardson.
Non-Final Office Action, mailed Dec. 5, 2008, in U.S. Appl. No. 11/456,157, filed Jul. 7, 2006, by Curtis R. Richardson.
U.S. Appl. No. 29/246,913, filed May 19, 2006.
U.S. Appl. No. 29/246,914, filed May 19, 2006.
U.S. Appl. No. 60/805,833, filed Jun. 26, 2006.
U.S. Appl. No. 60/807,726, filed Jul. 19, 2006.
U.S. Appl. No. 29/246,912, filed May 19, 2006.

* cited by examiner

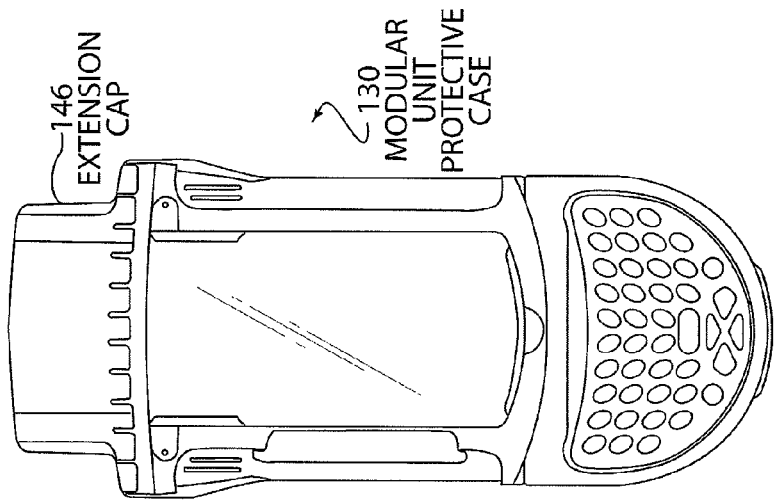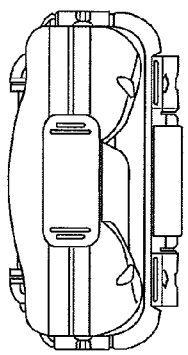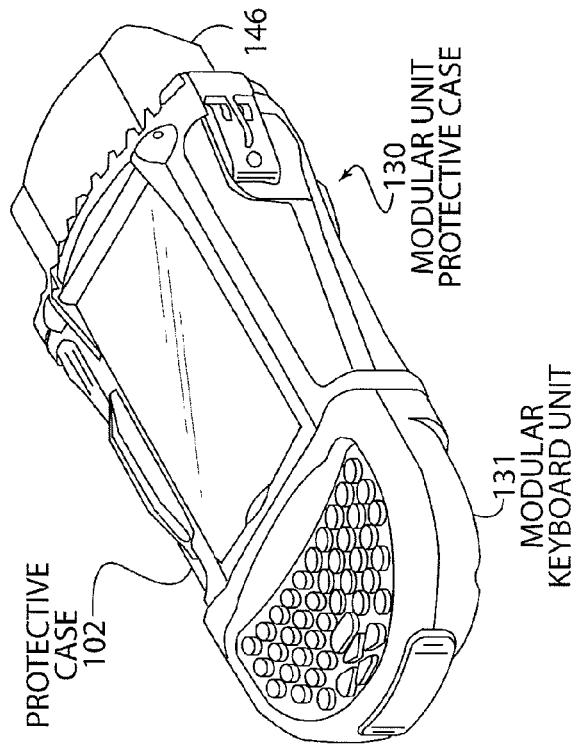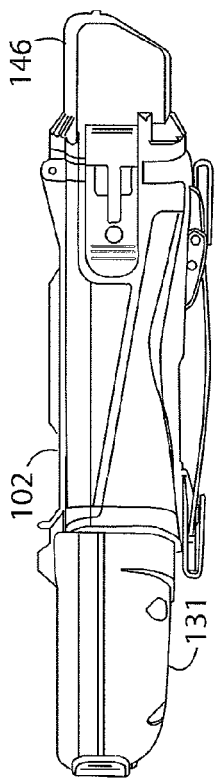

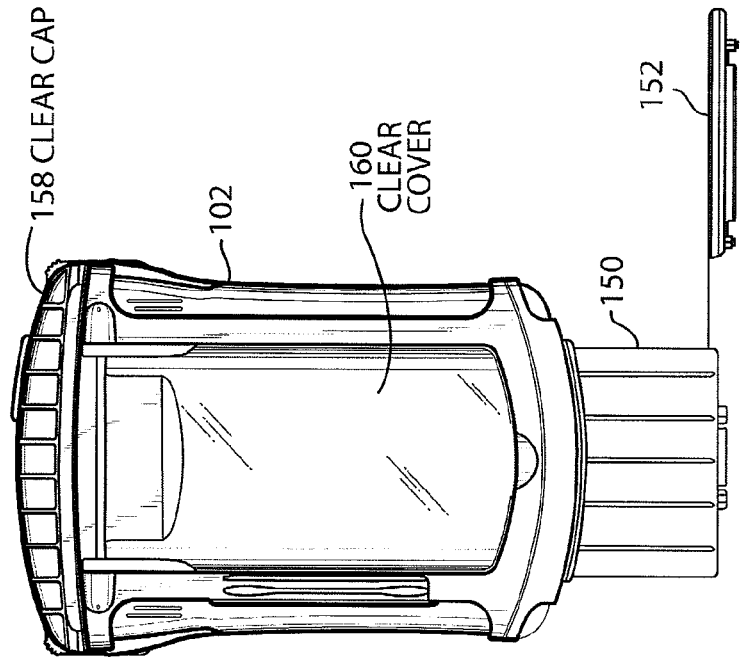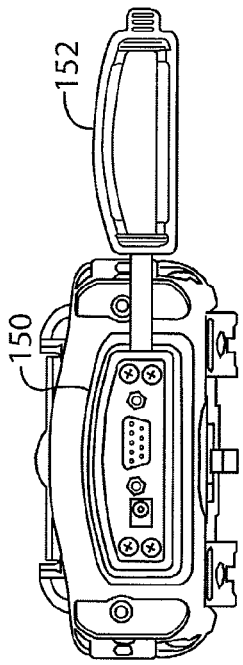
FIG. 8B
FIG. 8D
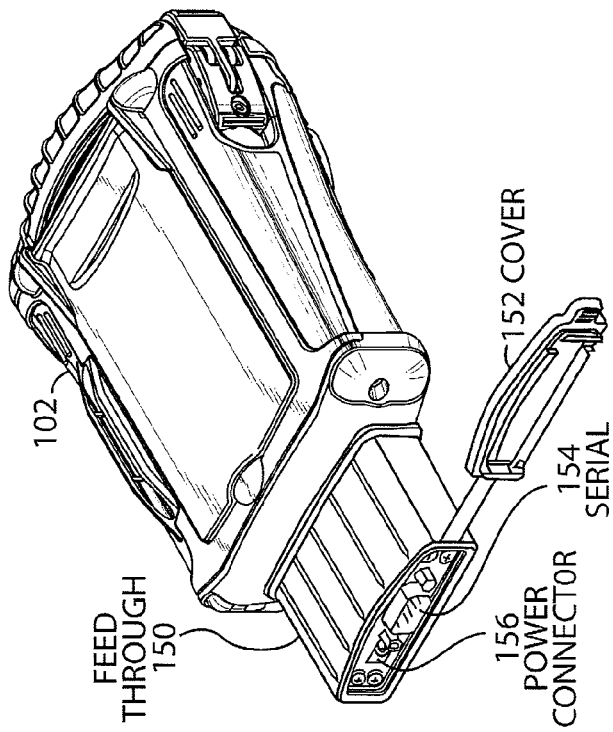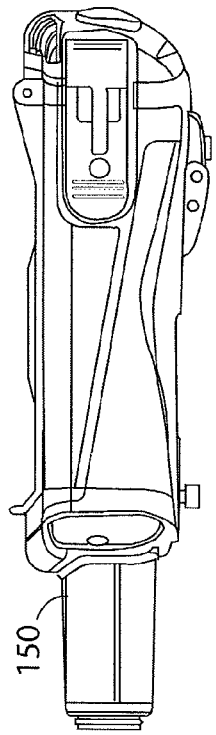
FIG. 8A
FIG. 8C

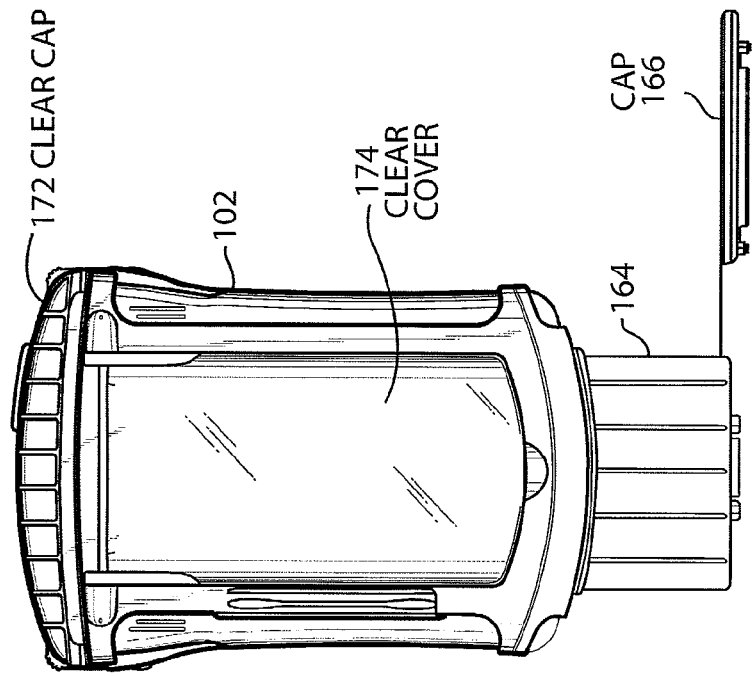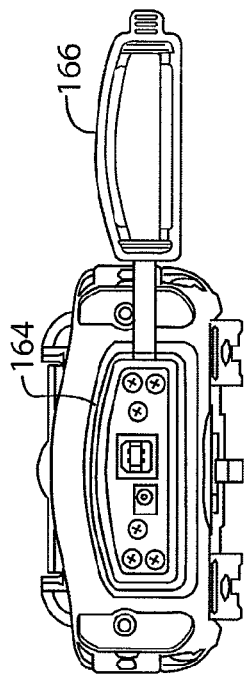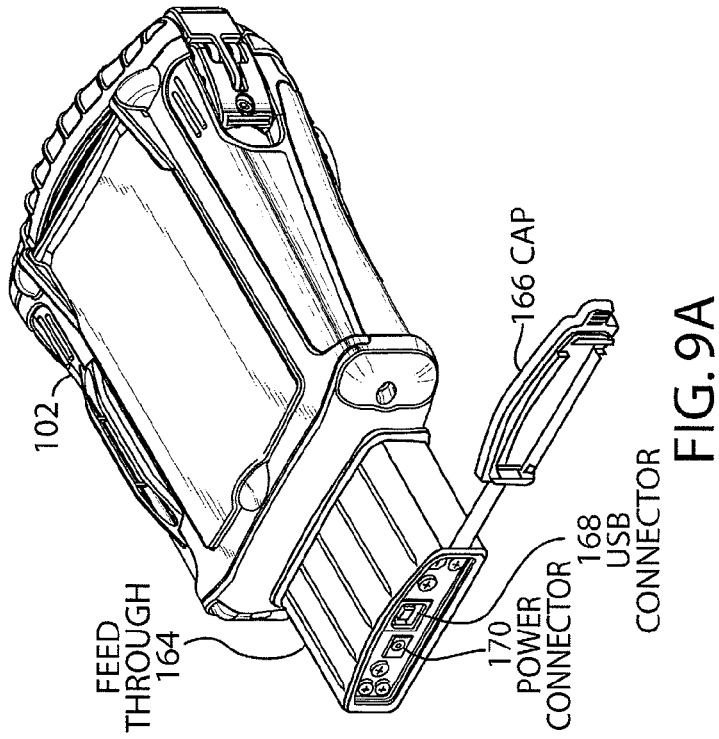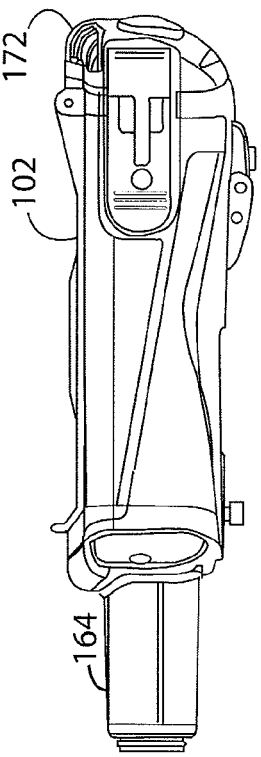

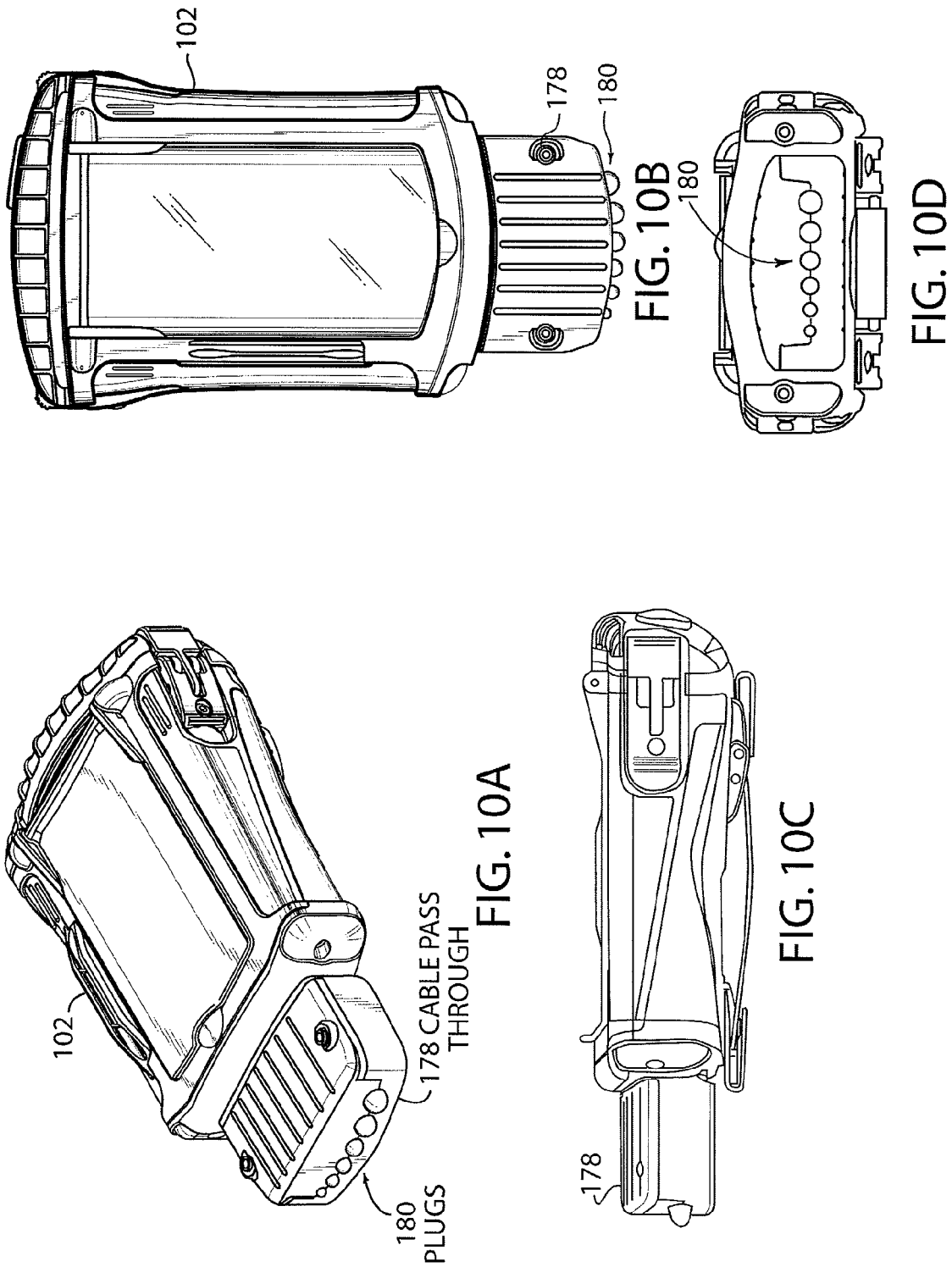

MODULAR ACCESSORY FOR PROTECTIVE CASE ENCLOSING TOUCH SCREEN DEVICE

CROSS REFERENCE TO RELATED APPLICATIONS

The present application is based upon U.S. provisional application Ser. No. 60/805,833 and is a continuation-in-part of U.S. application Ser. No. 11/466,342 filed Aug. 22, 2006, by Curtis R. Richardson, et al entitled "Protective Enclosure For Personal Digital Assistant Case Having Integrated Back Lighted Keyboard", which is a continuation-in-part of U.S. Pat. No. 7,230,823 entitled "Protective Case for Touch Screen Device" by Curtis R. Richardson, et al, issued Jun. 12, 2007, which is a continuation of U.S. Pat. No. 6,995,976 entitled "Protective Membrane for Touch Screen Device" by Curtis R. Richardson and Douglas A. Kempel, issued Feb. 7, 2006, which claims the benefit of and priority to U.S. Pat. No. 6,646,864 entitled "Protective Case for Touch Screen Device" by Curtis R. Richardson, issued Nov. 11, 2003, which claims the benefit of and priority to U.S. Provisional Patent Application Ser. No. 60/335,865 filed Nov. 19, 2001, by Curtis R. Richardson entitled "Protective Case for Touch Screen Device." The entire contents of these applications and patents are hereby specifically incorporated herein by reference for all they disclose and teach.

BACKGROUND OF THE INVENTION

Personal Digital Assistants and various types of electronic devices are widely used in various applications, such as in industrial, office, retail and other environments. The electronic devices that are described in the related applications set forth above provide various types of electronic device protective cases.

SUMMARY OF THE INVENTION

An embodiment of the present invention therefore comprises a method of interchangeably attaching a plurality of different modular units to a protective case for an electronic device comprising: providing the plurality of different modular units that are capable of performing different functions when connected to the electronic device; covering the modular units with a modular unit protective housing that is substantially waterproof and substantially crush proof; providing a modular unit connector on the modular unit protective housing that is the same for the plurality of different modular units; providing an electronic device protective case connector on the protective case that interconnects with the modular unit connector and provides a sturdy, rigid connection; connecting a first modular unit, that performs a first function when connected to the electronic device, to the electronic device protective case using a latch so that the first modular unit and the electronic device protective case form a single, integrated, rigid unit; separating the first modular unit from the electronic device protective case by unlatching said latch; and, connecting a second modular unit, that performs a second function when connected to the electronic device, to the protective case using said latch so that the first modular unit and the electronic device protective case form a single, integrated rigid unit.

An embodiment of the present invention may further comprise a two piece integrated protective housing comprising: a plurality of modular unit protective cases that house a plurality of modular units that perform different functions, the modular unit protective cases being substantially waterproof and substantially crushproof; a modular unit protective case connector disposed on the plurality of modular unit protective cases that is substantially the same for all of the plurality of modular unit protective cases; an electronic device protective case that houses an electronic device and that is substantially waterproof and substantially crushproof; and, an electronic device protective case connector disposed in the electronic device protective case that latches to the modular unit connector to provide a rigid, sturdy connection between the modular unit protective case and the electronic device protective case.

BRIEF DESCRIPTION OF THE DRAWINGS

In the drawings,

FIGS. 7A-7D illustrate the modular unit protective case 130 that uses an extension cap.

FIGS. 8A-8H illustrate a feed-through device using a serial connector.

FIGS. 9A-9H disclose a feed-through device using a USB connector.

FIGS. 10A-10H disclose a cable pass-through device.

BRIEF DESCRIPTION OF THE PREFERRED EMBODIMENT

Figure 1:
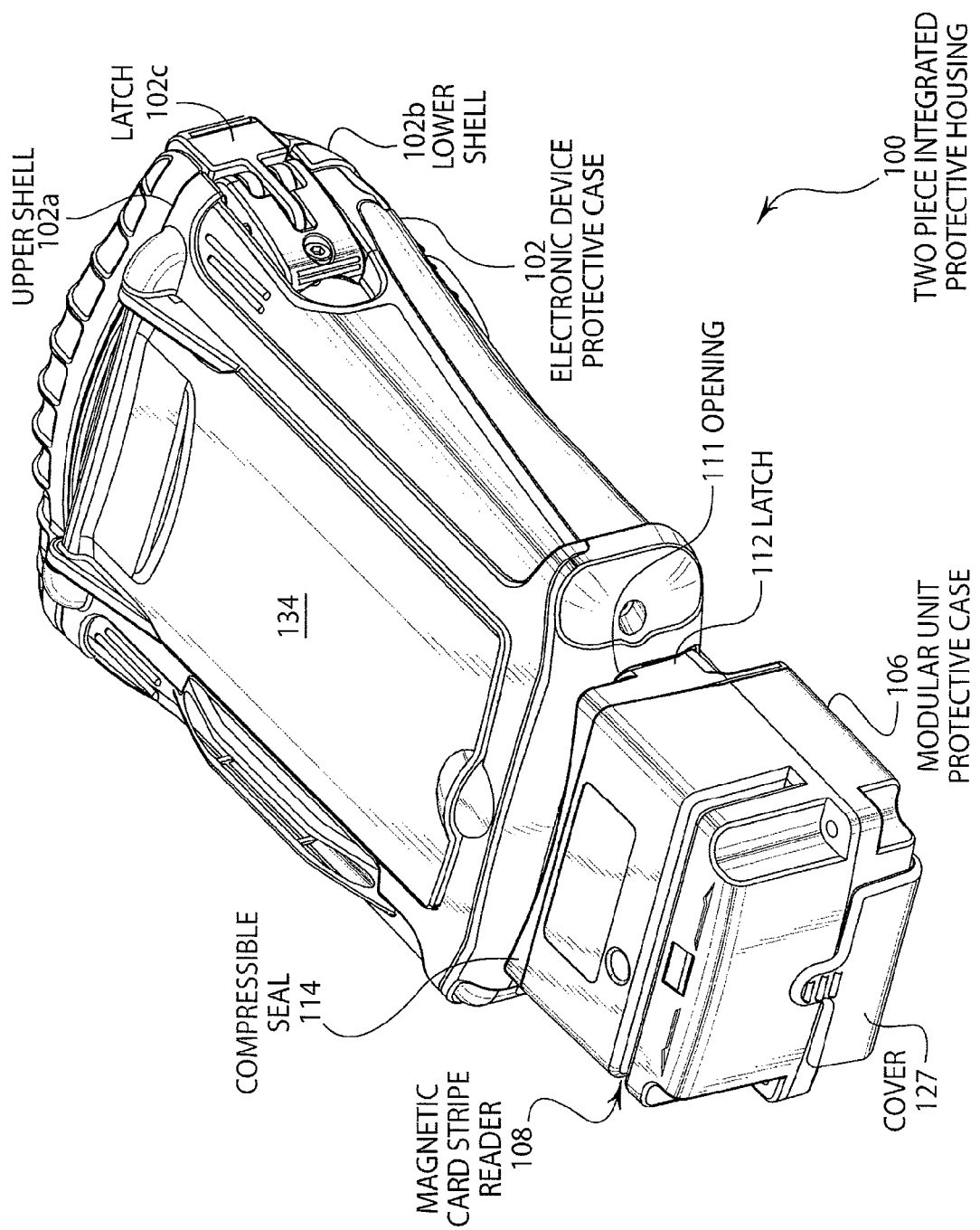
FIG. 1 is a perspective view of an embodiment of the invention illustrating a modular electronic device connected to a Protective case.

FIG. 1 is a perspective view of an embodiment of a two piece integrated, rigid protective housing 100. Housing 100 includes a rigidly molded electronic device protective case 102 that encloses an electronic device (not shown) or other device as disclosed in the above referenced related applications.

The molded electronic device protective case 102 is designed to hold an electronic device, such as, but not limited to, a conventional personal digital assistant, to allow use of the electronic device while the electronic device is disposed in protective case 102 and provide protection to the electronic device. The electronic device may be a device, such as a Palm Pilot, Handspring Visor, Hewlett Packard iPaq, or similar products that typically use a touch screen for display and data entry. Other devices include intelligent phones, navigational devices, MP3 players, handheld computers, tablet computers, etc.

As described in the aforementioned related applications, the electronic device protective case 102 may have different embodiments. The protective case 102 comprises a front shell 102a and rear shell 102b that are joined by a hinge (not shown) and a clasp mechanism 102c that is on the side of the shell opposite the hinge. Other embodiments may have a small door to slide the electronic device into the case, or the protective cover may not completely enclose the electronic device and only cover the face where the user interface exists, leaving one or more sides of the electronic device exposed.

Those skilled in the art may use other designs of protective covers without deviating from the scope and intent of the present invention. Data is entered into the electronic device through a thin membrane made from clear PVC or other materials that is under the protective cover 134 that covers the touch screen of the electronic device. A stylus can be used to enter data through the membrane of the case to interact with the touch screen.

Figure 2:
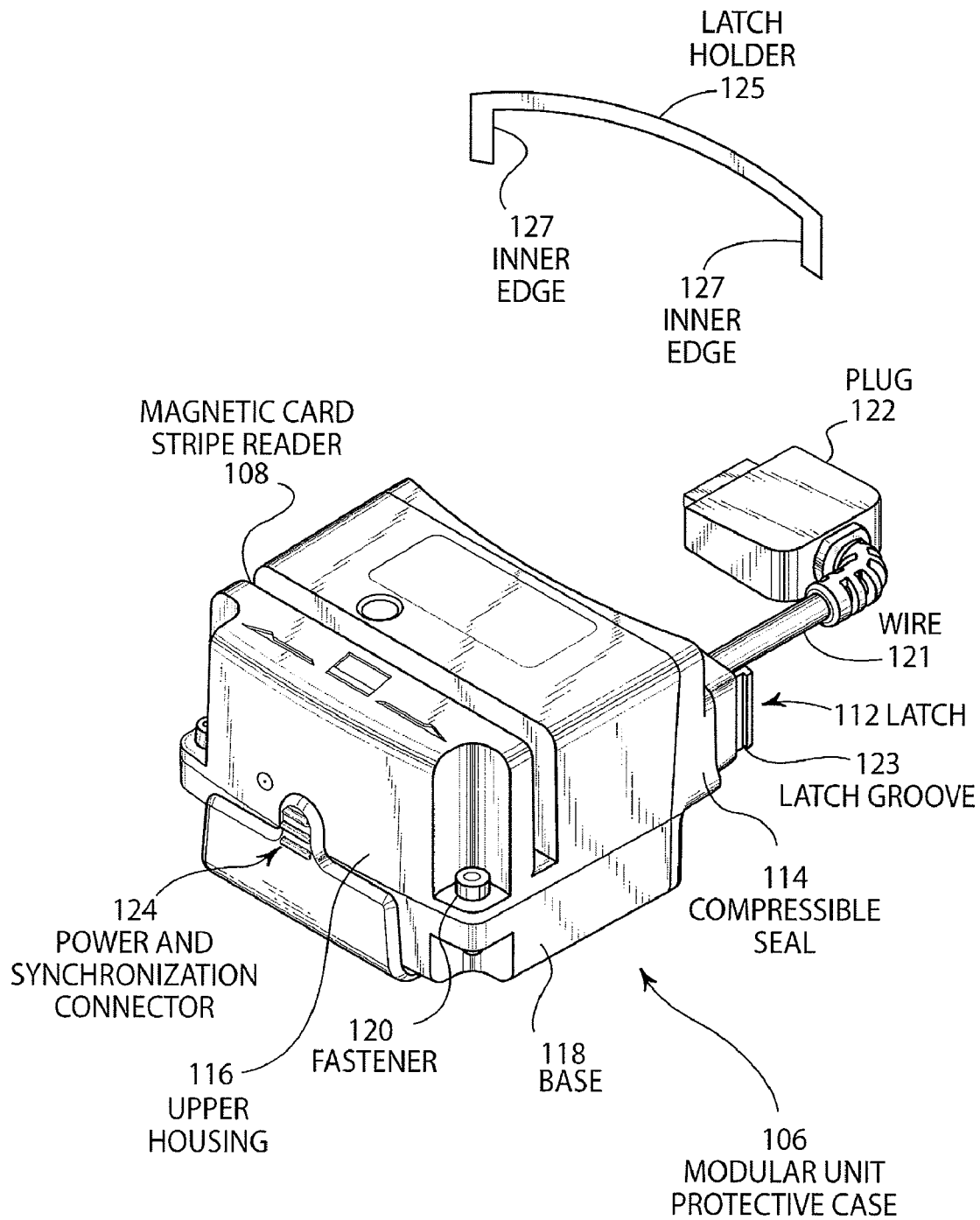
FIG. 2 is a perspective view of an embodiment of a modular electronic add-on device.

Housing 100 allows an additional data entry device or other device, to be used with the electronic device by providing an add-on modular device, such as a modular unit 106 having a magnetic card stripe reader (MSR) 108 that is adapted to electrically connect to the electronic device by plugging into the electronic device inside of the protective case 102. The MSR 108 is enclosed in a molded impact resistant and waterproof modular case 106 that attaches to the protective case 102. A plug 122 (FIG. 2) is provided to connect to the MSR 108 to the electronic device which is passed through an opening 111 in the end of the protective case 102 where the modular unit 106 is attached to the protective case 107. The MSR 108 operates in the traditional method of reading a magnetic card using a magnetic card reader.

The MSR 108 has the ability to read many different types of cards having magnetic stripes, including credit cards, debit cards, identification cards, driver's licenses, discount cards, phone cards, smart cards, and any other types of cards. The MSR 108 reads information stored on a magnetic stripe of a card by passing the card through the MSR slot 108. The MSR 108 is adapted to read up to three tracks which may contain a plurality of formats. The components of the MSR 108 that read various types of cards are not shown as they are well known to those skilled in the art. Also, as disclosed in the aforementioned related applications, a thin transparent membrane disposed under cover 134 forms part of the protective case 102. The cover 134 may also be transparent so that the images displayed on the electronic device may be visible through the case. Thus, with the appropriate software and synchronization, the electronic device may also serve as a display for information read by the MSR 108.

Both the protective case 102 and the modular unit 106 can be designed for rugged industrial use or commercial use, or many other uses which may require protection where watertight, chemically resistant, and impact resistant protection is needed. The modular unit 106 easily attaches to the case 102 without tools utilizing latches 112 and latch holder 125. Latches 112 on both sides of modular unit 106 are inserted through the opening 111 at the end of the protective case 102 and releasably latch to protective case 102 by sliding the latch holder 125 into the latch grooves 123 on latches 112 to make firm connection to the protective case 102. Once the modular unit 106 is connected to the protective case 102, the modular unit 106 forms a rigid connection to the case so that the user can use the combination of the protective case 102 and MSR modular unit 106 as a single integrated unit 100. A compressible seal 114 forms a waterproof connection to the protective case 102. The latches 112 that connect modular unit 106 and the protective case 102 can be released by sliding the latch holder upwardly to disengage the inner edge 127 of the latch holder 125 from the latch groove 123.

The modular unit 106 may be constructed of rigid plastic, flexible rubber, or any other material that can be rigidly connected to the electronic device protective case 102 and provide protection similar to that provided by the protective case 102. The modular unit 106 is generally comprised of a molded two piece design having an upper housing 116 and a base 118 held together by fasteners, such as fasteners 120. A connector, such as a USB waterproof connector 122 is adapted to electrically connect to the electronic device inside of the protective case 102. However, other suitable means maybe be employed to electrically connect the modular unit 106 to the electronic device, as appropriate, to transmit information from the modular unit 106 to the electronic device. The plug 122 is fed through the opening 111 in the protective case 102. An integrated power and synchronization connector 124 is built into the modular unit 106 that is under the watertight cover 127 that allows synchronization with other computers or electronic devices that may contain software also utilized by the electronic device. For example, the electronic device may be synchronized with an email program on a desktop computer.

Figure 3:
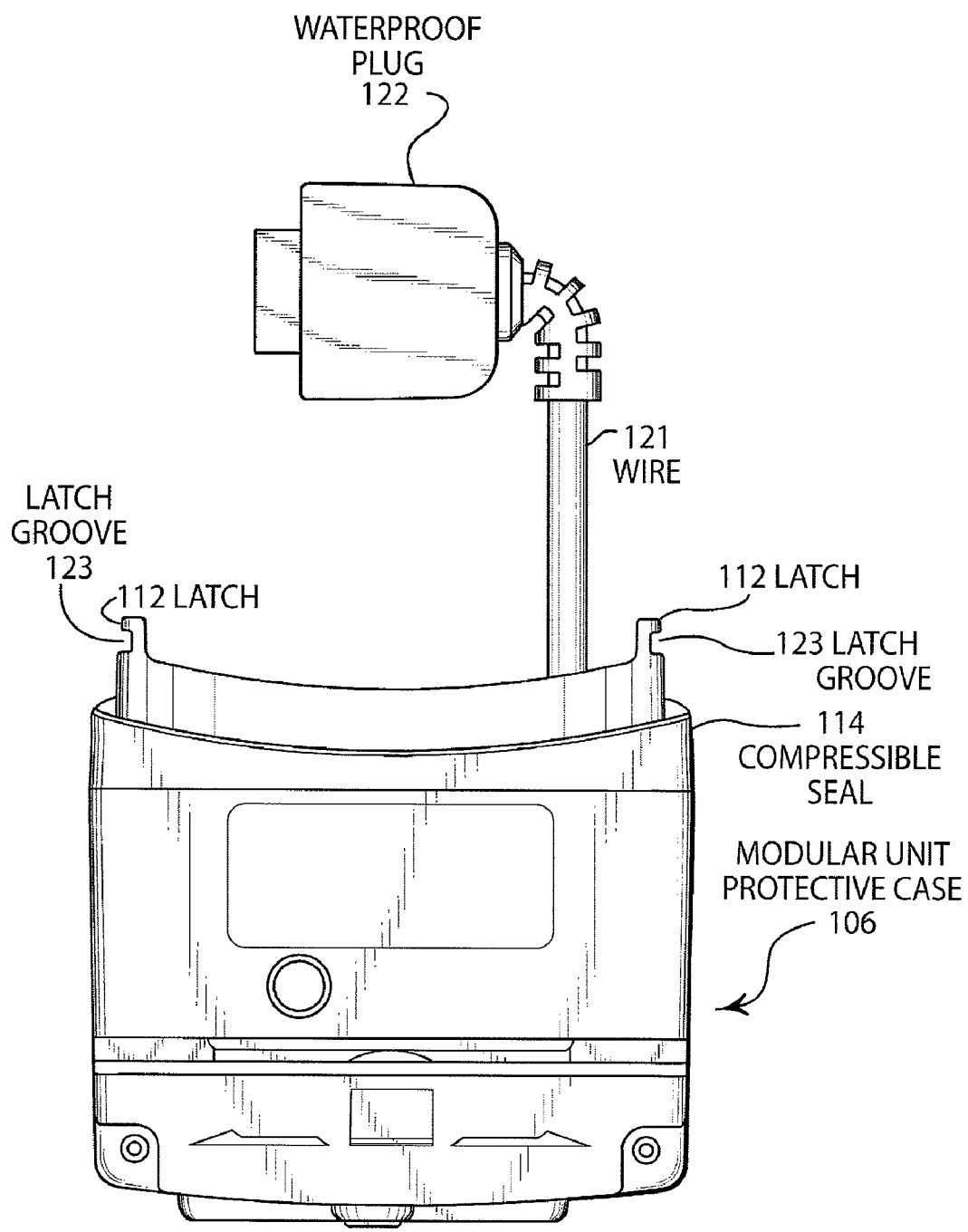
FIG. 3 is a top view of the modular electronic add-on device of FIG. 2.

Referring to FIG. 3, there is shown a bottom view of the modular unit 106 illustrating the compressible seal 114 and the latches 112 that extend into the opening 111 in the protective case 102 of FIG. 1 to latch onto the case 102 using latch holder 125 without the use of tools. The latches 112 are designed to allow the inner edges 127 of the latch holder 125 to slide into grooves 123 of latches 112 and hold the modular unit 106 tightly to the protective case 102 so that the grommet 114 forms a waterproof connection with the protective case 102. The modular unit 106 is compact and adds only a few inches to the overall dimensions of the protective case 102. The modular unit 106 is just one of several electronic devices that may be attached to electronic devices for supplying additional data input which all use the same latching mechanism to provide interoperability. Other modular input data units may be used with the protective case, such as keyboards, bar code readers, RFID readers, GPS receivers, etc. All of these devices connect to the protective case 102 in a manner that maintains the rugged environmental protection characteristics of the protective case 102. In addition, the modular input data units can be built with the same rugged environmental protective design. These modular input data units can attach to the protective case using the same connection interface, such as, but not by way of limitation, the configuration of latches 112 and latch holder 125 that are illustrated in FIGS. 1 and 3, so that any modular data input unit can be used, as desired, and these devices can be interchangeably connected to the electronic device protective case 102 and the electronic device. As described above, the modular data input units attach to the protective case in a firm, rigid manner so that the user can use the combination as a single integrated unit.

Figure 4:
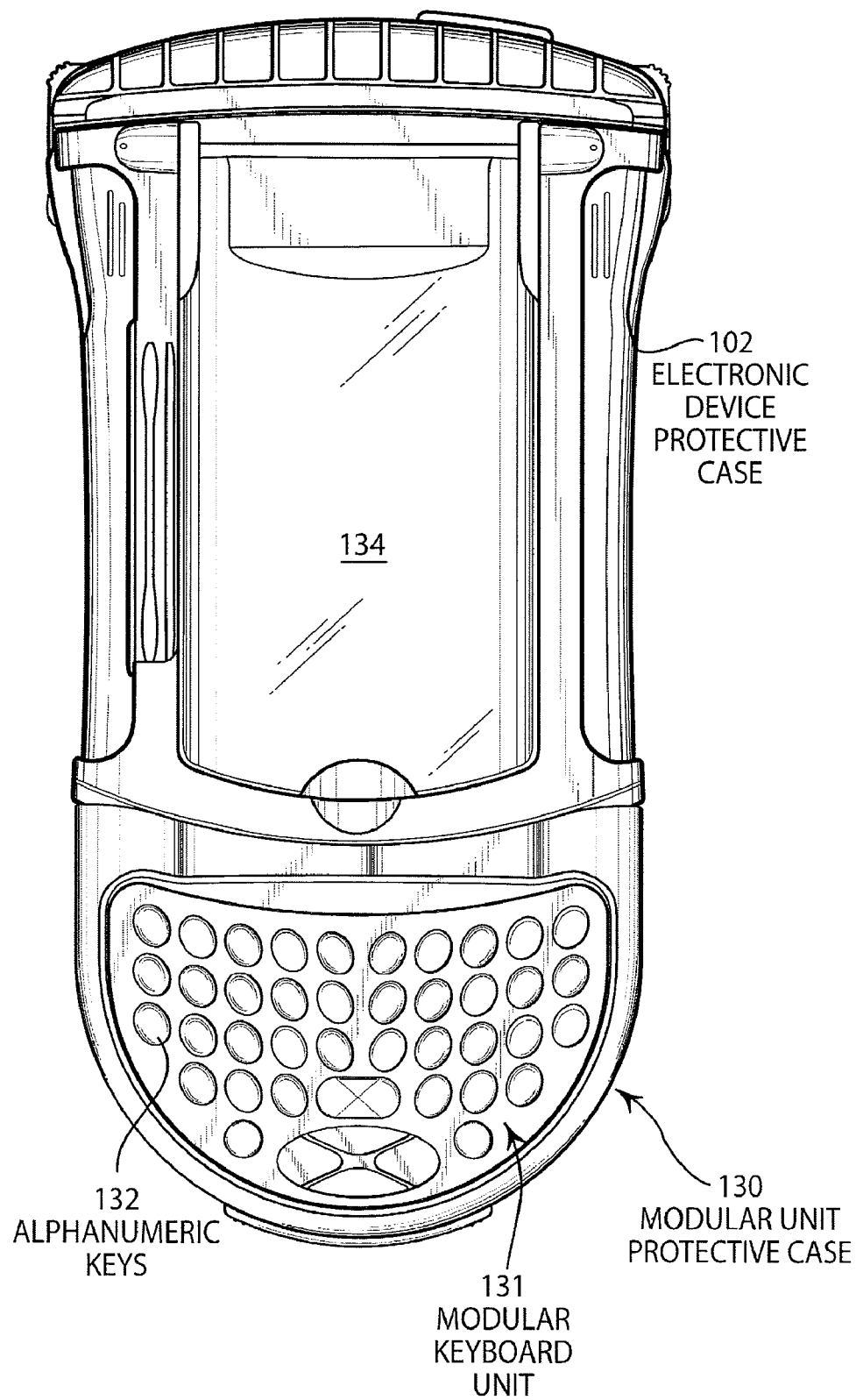
FIG. 4 is a top view of an another embodiment of the invention illustrating a modular electronic device connected to a protective case.
Figure 5:
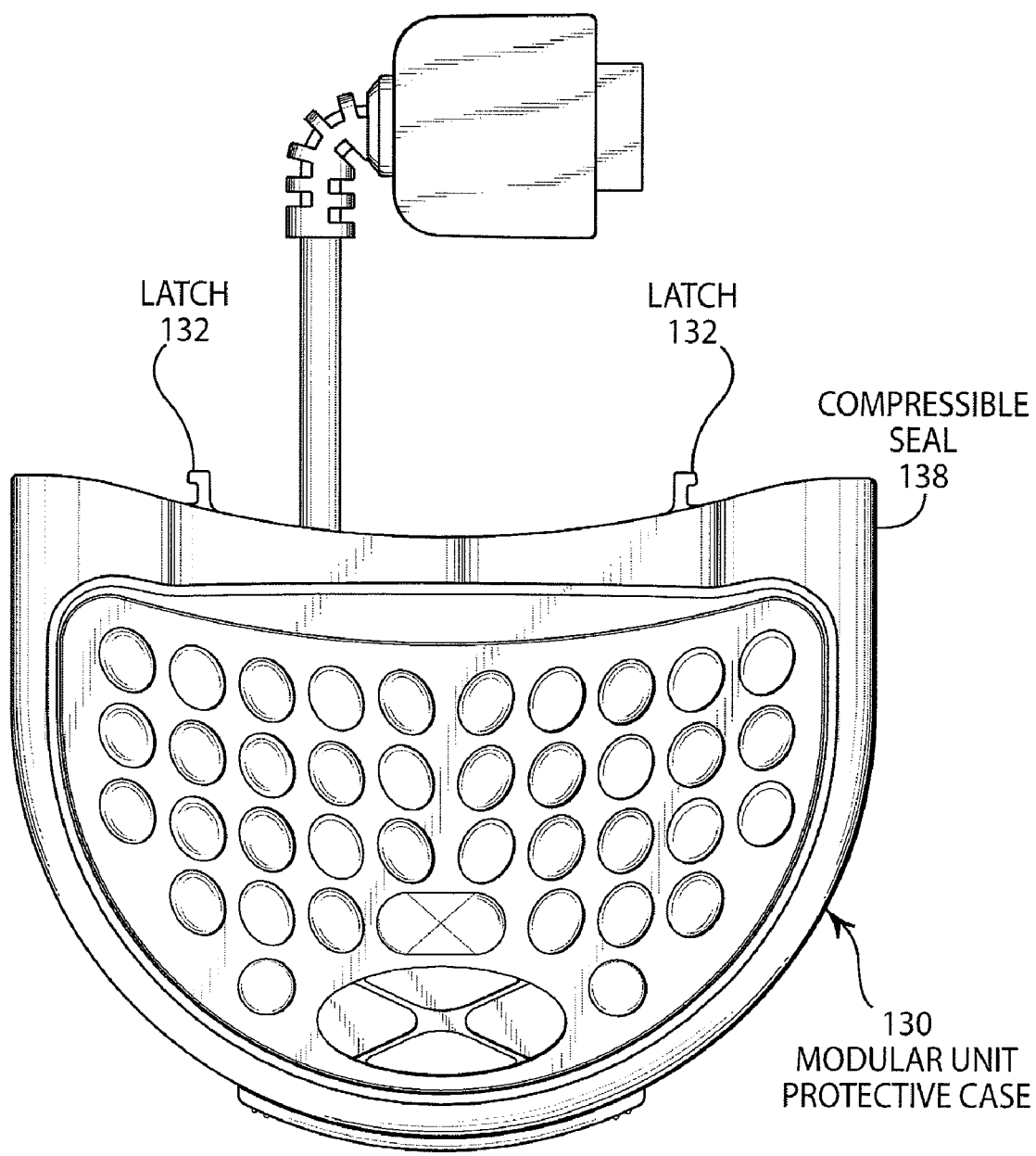
FIG. 5 is a top view of the embodiment of the modular electronic add-on device of FIG. 4.

Another embodiment of such a modular data input unit for attachment to the electronic device protective case 102 is shown in FIGS. 4 and 5. A modular unit protective case 130 is illustrated that comprises a detachable modular keyboard unit 131 having a plurality of alphanumeric keys 132. This modular keyboard unit 131 is enclosed in a modular protective case 130 that complements the electronic device protective case 102 and maintains the environmental protective characteristics of the electronic device protective case 102 and the electronic device. Similar to the protective case 102 and the modular unit 106, the modular keyboard unit 131 is designed for rugged industrial use or commercial use, or many other uses which may require protection where watertight, chemically resistant, and impact protection is needed. Also, the modular unit case 130 easily attaches to the electronic device protective case 102 without tools, utilizing latches 132, as shown in FIG. 5, and latch holder 125. The latches 132 extend into the protective case 102 and latch onto the case 102 using a latch holder 125 in a secure, rigid manner. The latches 132 are designed to fit tightly into the protective case 102 so that the compressible seal 138 is compressed between the modular unit case 130 and protective case 102 to form a waterproof connection. The latches 132 are inserted into an opening (not shown) in the end of case 102 and latch using a latch holder 125 that fits snugly against an inner wall of the protective case 102. Once the modular unit 130 is connected to the protective case, the modular unit case 130 forms a solid, rigid connection to the protective case 102 so that the user can use the combination of the protective case 102 and the modular unit case 130 as a single integrated unit.

The modular unit case 130 may also be constructed of rigid plastic, flexible rubber, or any other type of material that can be adapted to provide the protection similar to that provided by the protective case 102. The modular keyboard unit 131 includes a plurality of input functions and alphanumeric keys 132. The modular keyboard unit 131 may be laid out in the traditional Qwerty format or other formats. As disclosed in the aforementioned related applications, the molded features of the protective case 102 may be adapted to retain a stylus for input of information through the thin transparent cover to operate a touch screen on the electronic device. The modular keyboard unit 131 may also be operated by the stylus to provide ease of use.

As disclosed in the aforementioned related applications, a thin transparent membrane under the cover 134 forms part of the protective case 102 so that the images displayed on the electronic device may be visible while the electronic device is in the protective case 102. As mentioned above, the cover 134 may also be transparent and made from polycarbonate so that the screen of the electronic device can be viewed with the cover 134 down. With the appropriate software, the electronic device may also serve as a display for the modular keyboard unit 131.

Figure 6:
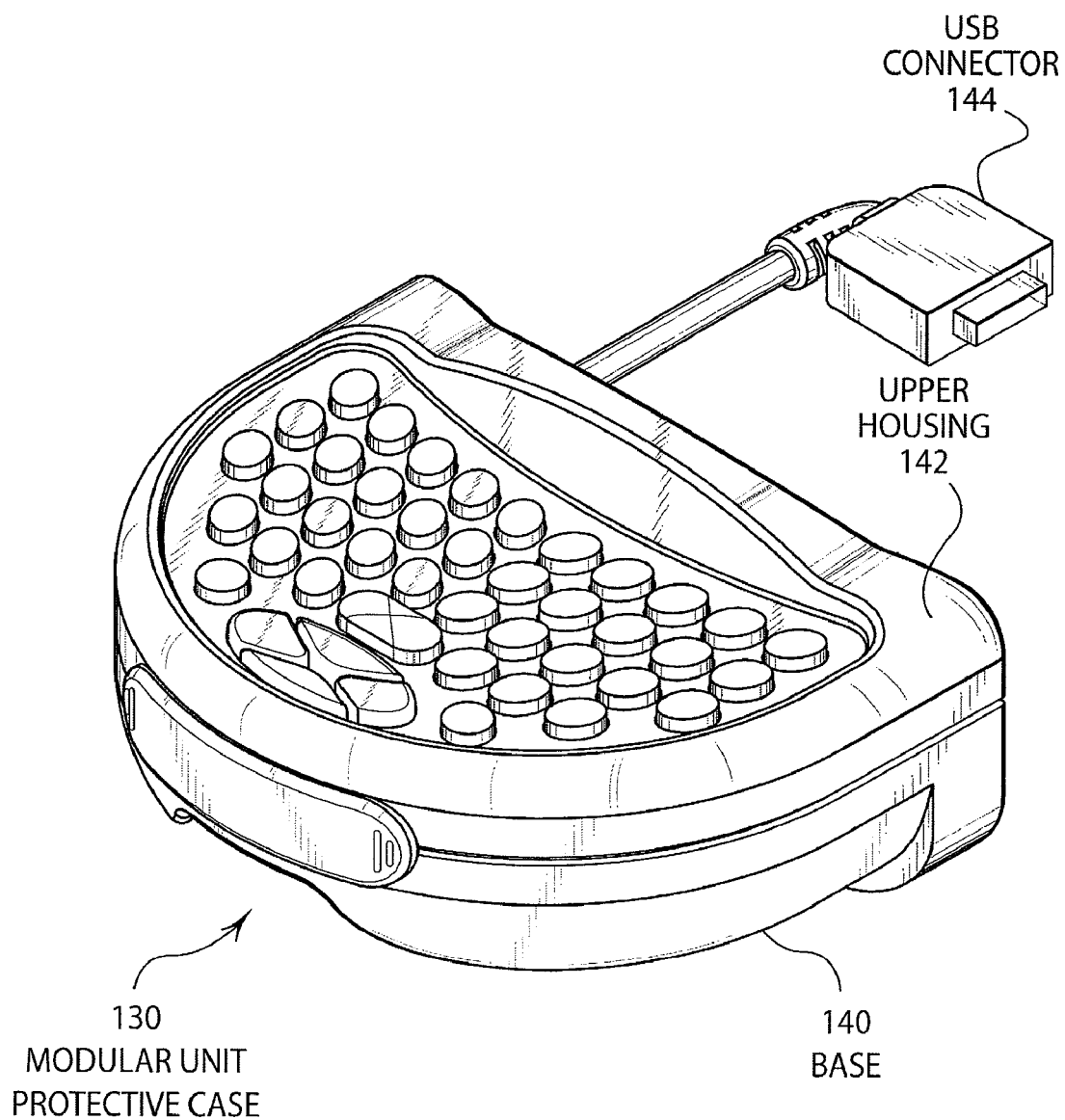
FIG. 6 is a perspective view of the modular electronic add-on device FIG. 5.
Figure 8E:
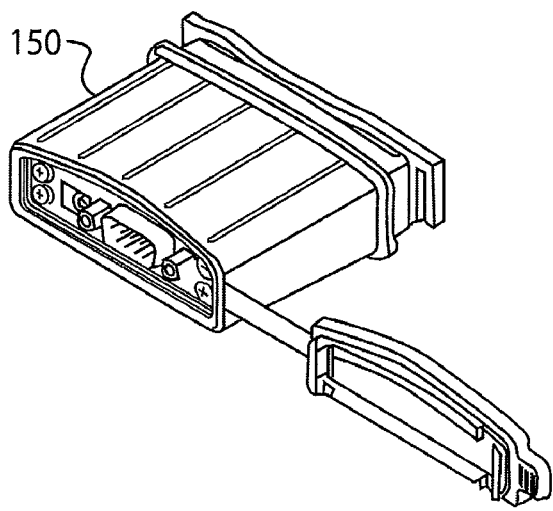
Figure 8F:
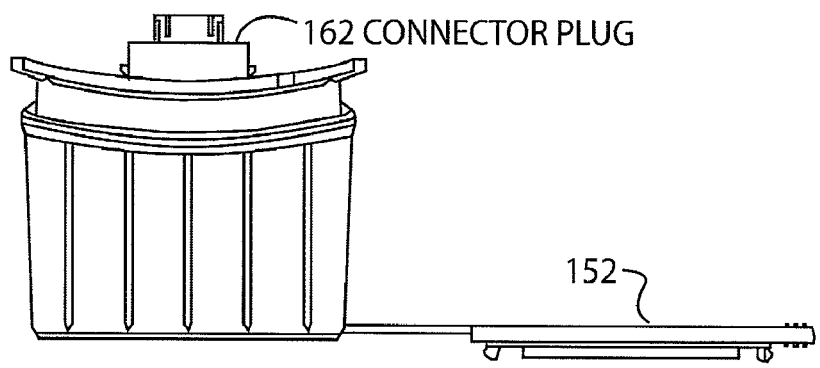
Figure 8G:
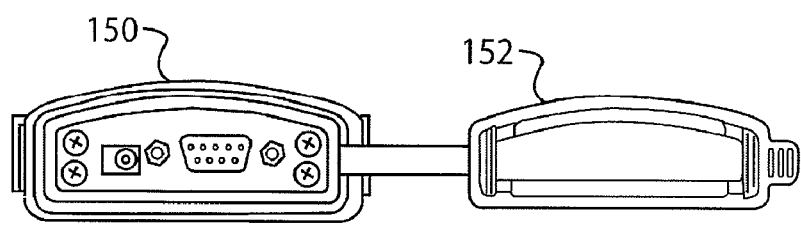
Figure 8H:
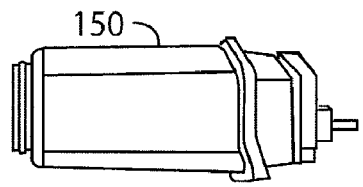
Figure 9E:
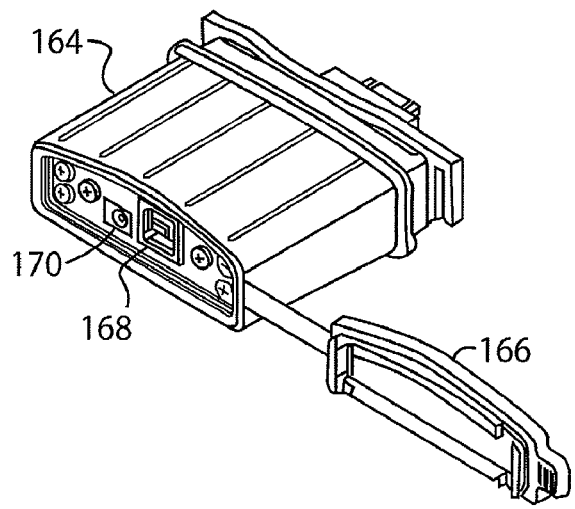
Figure 9F:
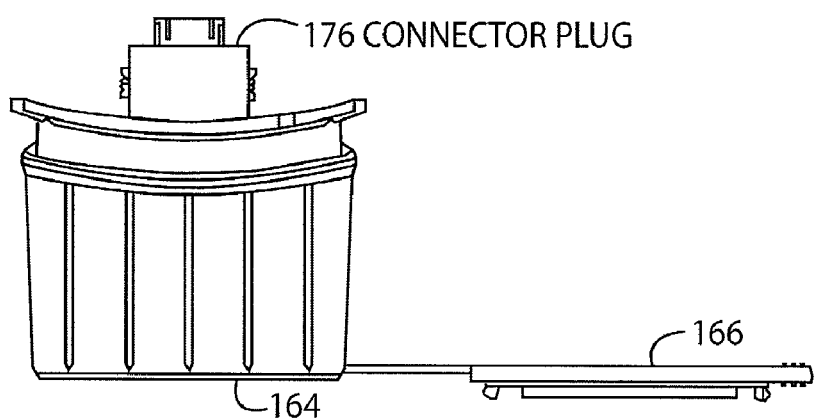
Figure 9G:
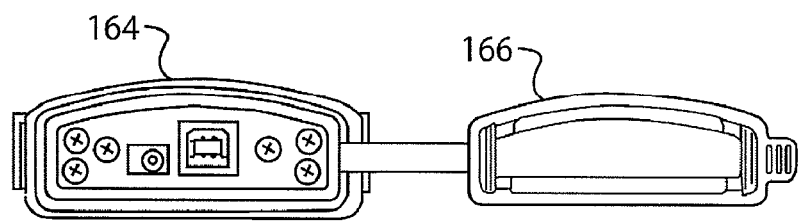
Figure 9H:
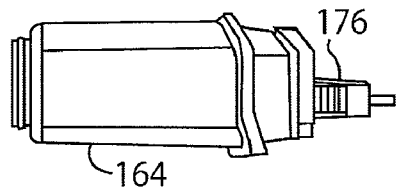

Referring to FIG. 6, the modular unit case 130 is generally comprised of a molded two piece design, having a base 140 and an upper housing 142 that are held together by fasteners (not shown) or sealed together. A connector, such as a USB connector 144, is adapted to electrically connect to the electronic device. However, other suitable connectors may be may be employed to electrically connect the modular unit keyboard 131 to the electronic device as appropriate to input the information from the keyboard 130, including wireless links, such as Blue Tooth links, ir links, and any other types of communication links used by the electronic device.

FIGS. 7A-7D illustrate the modular unit protective case 130. The modular unit protective case 130 includes a modular keyboard unit 131 that is firmly attached to protective case 102 in a watertight manner. The modular unit protective case 130 includes an extension cap 146 that can be made of a hard, clear material such as polycarbonate. The extension cap 146 can house a bar code reader that is capable of reading bar codes through an optical window in the extension cap 146. Extension cap 146 also provides extra room for housing a GPS device, or other devices connected to the electronic device, if desired. The modular keyboard unit 131, as disclosed above, provides an external keyboard that can be used in harsh environments and allows the user to enter information into the electronic device housed in the protective case 102 rather than entering information using a stylist through a touch window.

FIGS. 8A-8H disclose a protective case 102 that is connected to a feed-through device 150. Feed-through device 150 is coupled to the protective case 102 in the same manner as the other modular units disclosed herein. The feed-through device 150 has a serial connector 154 that allows a serial connection to be made to an external device such as a personal computer. Power connector 156 allows external powering of the electronic device. Cover 152 snaps into place and provides a waterproof covering for the opening in the end of the feed-through device 150. The electronic device is connected to a connector plug 162 inside the protective case 102. By connecting the serial connector to an external PC device, information such as email and contact information can be synched between the personal computer and the electronic device housed in protective case 102. Protective case 102 has a clear cap 158 attached to an opposite end of the protective case 102. The protective case 102 also has a clear cover 160 that can be made of polycarbonate or other similar material that allows the user to view information through the clear cover 160 and the membrane that forms a part of the protective case 102.

FIGS. 9A-9H disclose another embodiment of a feed-through device 164 connected to a protective case 102. Feed-through device 164 has a USB connector 168 that can be connected to an external device such as a PC. Power connector 170 allows external power to be applied to the electronic device. Connector plug 176 connects to the electronic device on the interior portion of the protective case 102 and allows data from the USB connector 168 to be transferred between the electronic device and an external device such as a PC. Power connector 170 also supplies power through the connector plug 176. Cap 166 seals the opening in the feed-through 164 to prevent moisture, dirt and dust from entering the opening in the feed-through 164. The protective case 102 also has a clear cover 174 and a clear cap 172. Clear cap 172 may allow infrared communications to be transmitted from the electronic device to an external device such as a printer.

Figure 10E:
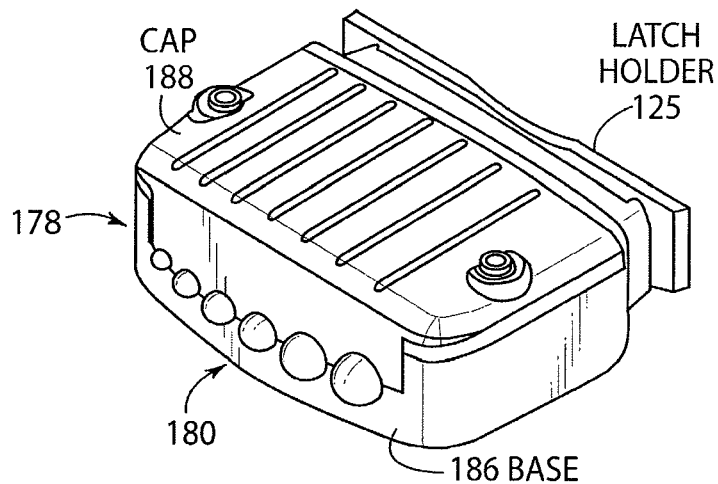
Figure 10F:
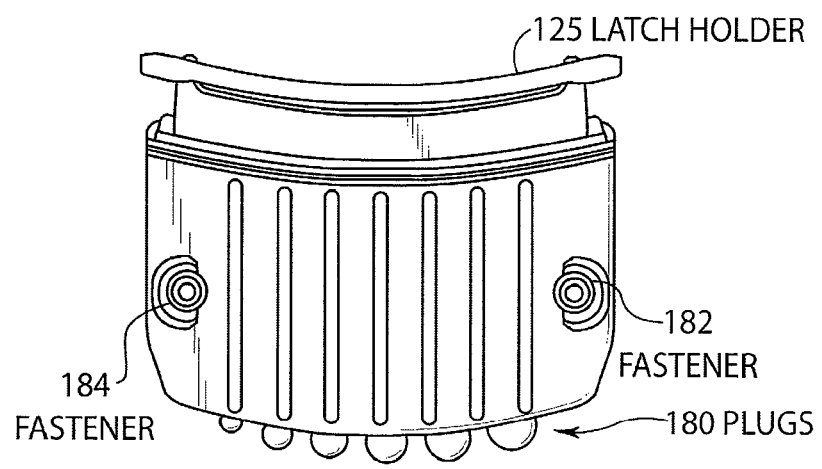
Figure 10G:
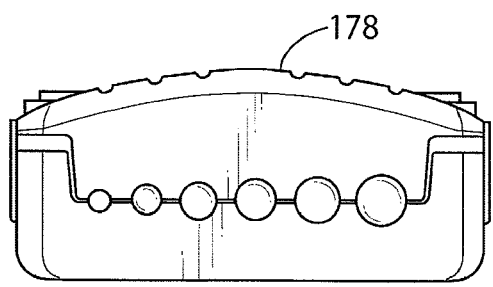
Figure 10H:
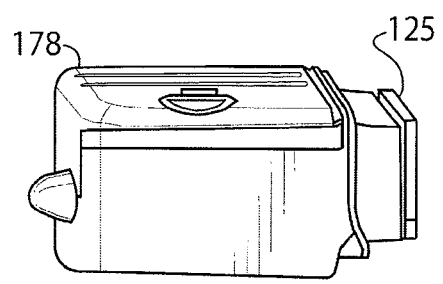

FIGS. 10A-10H disclose a cable pass-through device 178 that is connected to a protective case 102. Cable pass-through device 178 is connected to the protective case 102 using the same connection format as the other modular units. Plugs 180 plug openings in the cable pass-through 178. As can be seen from FIGS. 10A, 10B, 10D, 10E, 10F and 10G, the plugs 180 plug openings in the cable feed-through device 178. Fasteners 182, 184 can be loosened or removed so that one or more plugs 180 can be taken out of the openings between the base portion 186 and the cap portion 188. The plugs are removed to match the correct cable size for cables that are to be fed through the cable pass-through device 178 for connection to the electronic device which is housed in the protective case 102. The fasteners 182, 184 can then be replaced and tightened to form a tight seal in the cable feed-through device 178 to prevent moisture, chemicals or dust and dirt from passing into the cable feed-through device 178. FIGS. 10E, 10F and 10H also illustrate the latch holder 125 that is placed in position on the latch disposed on the feed-through device 178. The latch holder 125 is removed when the feed-through device 178 is placed into the opening in the end of the protective case 102. The latch holder 125 is then slid down onto the latches to hold the modular unit in place. The same format of latches and latch holder are used for all the modular devices so that all of the modular devices can be used interchangeably with the protective case 102.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. Other modular add on devices which may include, bar code readers, RFID readers, GPS receivers, etc. All of these devices may connect to the protective case 102 in a manner that maintains the rugged environmental protection characteristics of the protective case and in addition provides modular data units for communication with the electronic device in a case that is built with the same rugged environmental protective standards. These units attach to the protective case in a rigid manner so that the user can use the combination as a single integrated unit. It is intended that the appended claims be construed to include other alternative embodiments of the invention except insofar as limited by the prior art.

What is claimed is:

1. A method of interchangeably attaching a plurality of different modular units to a protective case for an electronic device comprising:
   providing said plurality of different modular units that are capable of performing different functions when connected to said electronic device;
   covering said modular units with a modular unit protective housing that is substantially waterproof and substantially crush proof;
   providing a modular unit connector on said modular unit protective housing that is the same for said plurality of different modular units;
   providing an electronic device protective case connector on said protective case that interconnects with said modular unit connector and provides a sturdy, rigid connection;
   connecting a first modular unit, that performs a first function when connected to said electronic device, to said electronic device protective case using a latch so that said first modular unit and said protective case form a single, integrated, rigid unit;
   separating said first modular unit from said electronic device protective case by unlatching said latch; and
   connecting a second modular unit, that performs a second function when connected to said electronic device, to said protective case using said latch so that said first modular unit and said electronic device protective case form a single, integrated rigid unit.

2. The method of claim 1 wherein said step of providing a modular unit connector comprises:
   providing a modular unit connector that includes a compressible gasket that compresses and forms a watertight seal between said modular unit protective housing and said protective case.

3. The method of claim 2 further comprising:
   connecting a communication link between said modular unit and said electronic device.

4. The method of claim 3 wherein said step of connecting a communication link further comprises:
   connecting a wire connection from said modular unit to said electronic device using a connector plug.

5. The method of claim 4 further comprising:
   securing said latch using a latch holder.

6. The method of claim 3 wherein said step of connecting a communication link further comprises:
   connecting a wireless link between said modular unit and said electronic device.

7. A two piece integrated protective housing comprising:
   a plurality of modular unit protective cases that house a plurality of modular units that perform different functions, said modular unit protective cases being substantially waterproof and substantially crushproof;
   a modular unit protective case connector disposed on said plurality of modular unit protective cases that is substantially the same for all of said plurality of modular unit protective cases;
   an electronic device protective case that houses an electronic device and that is substantially waterproof and substantially crushproof; and
   an electronic device protective case connector disposed in said electronic device protective case that latches to said modular unit connector to provide a rigid, sturdy connection between said modular unit protective case.

8. The two piece protective housing of claim 7 further comprising:
   a compressible gasket disposed between said modular unit protective cases and said electronic device protective case that compresses and forms a watertight seal between said modular unit protective case and said electronic device protective case when said modular unit protective case connector is connected to said electronic device protective case connector.

9. The two piece protective housing of claim 8 further comprising:
   a communication link that connects said modular units to said electronic device.

10. The two piece protective housing of claim 9 wherein said communication link comprises:
    a wire connected to said modular units;
    a connector plug that plugs into said electronic device.

11. The two piece housing of claim 9 wherein said communication link comprises a wireless connection.

* * * * *